UNITED STATES PATENT OFFICE.

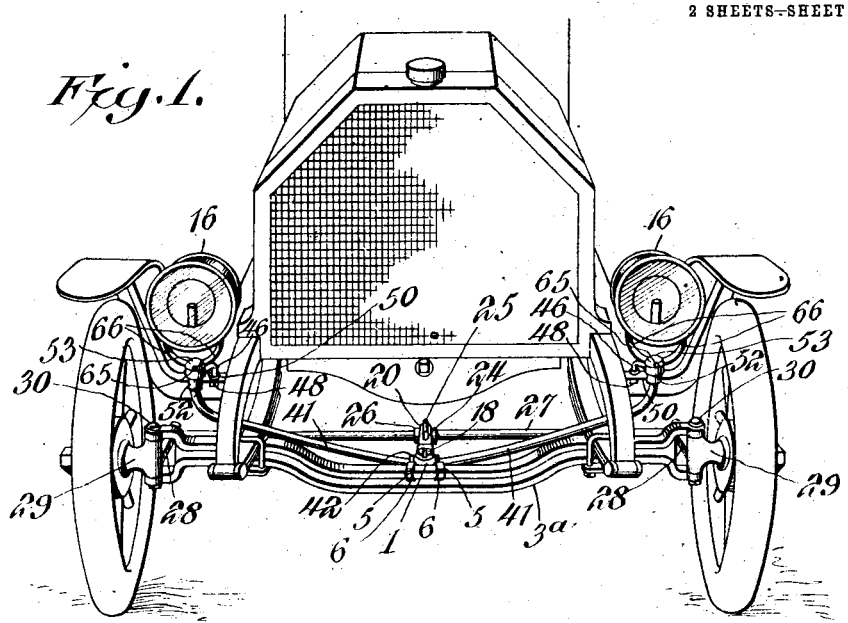
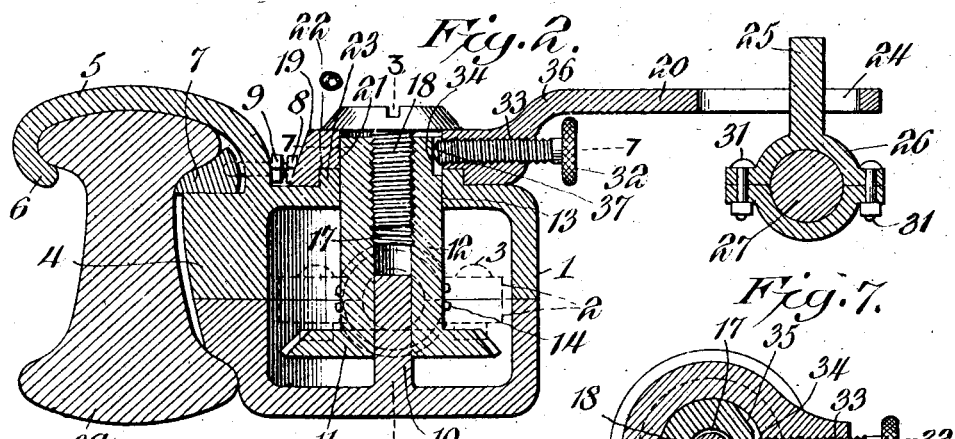
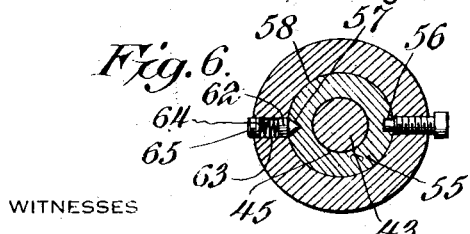

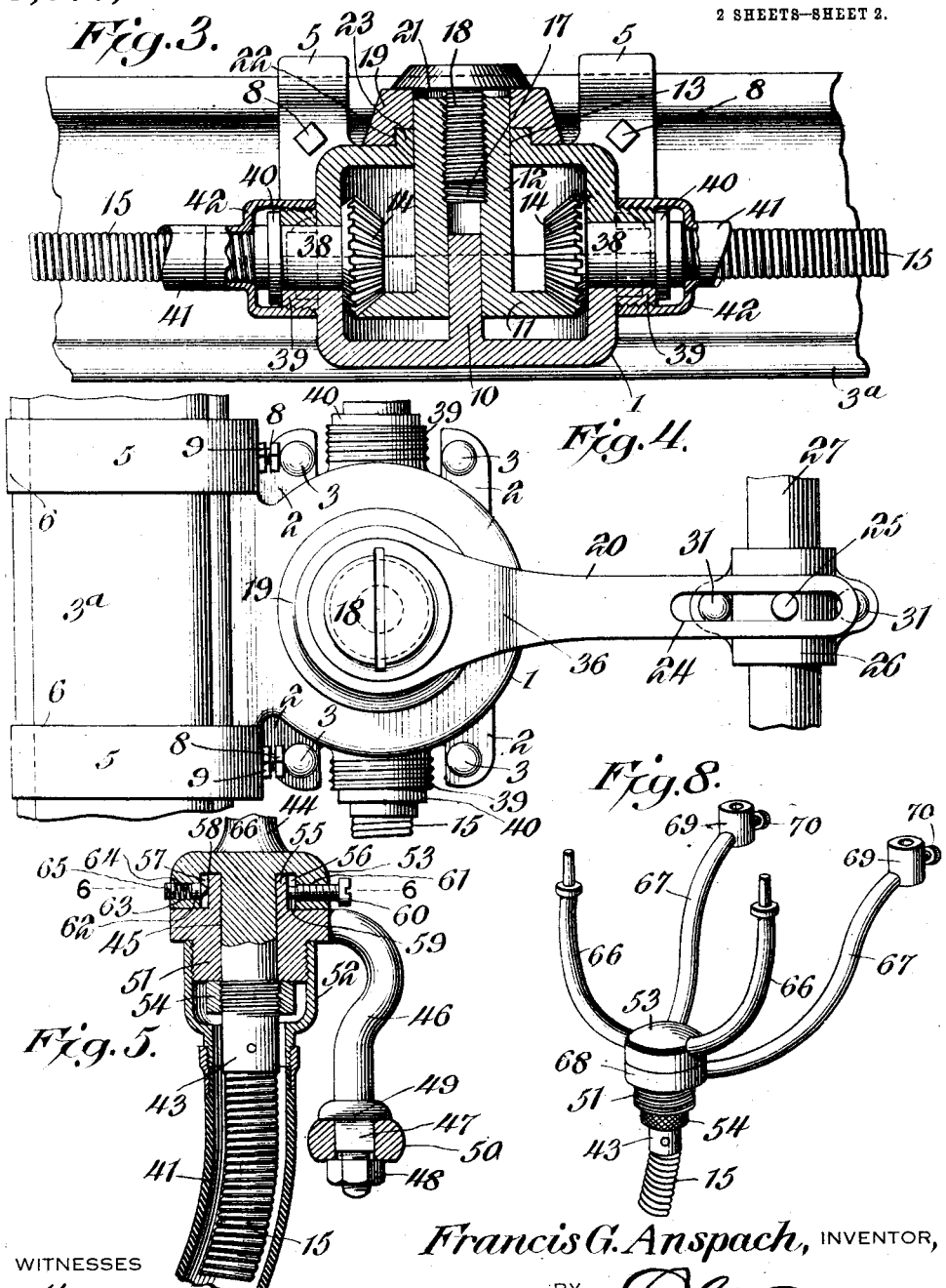

FRANCIS G. ANSPACH, OF DEERFIELD, MICHIGAN, ASSIGNOR OF ONE-THIRD TO VERNOR B. CANNON, OF DEERFIELD, MICHIGAN.

CONTROLLABLE HEADLIGHT FOR AUTOMOBILES.

1,077,450.  Specification of Letters Patent.  Patented Nov. 4, 1913.

Application filed July 16, 1912. Serial No. 709,763.

*To all whom it may concern:*

Be it known that I, FRANCIS G. ANSPACH, a citizen of the United States, residing at Deerfield, in the county of Lenawee and State of Michigan, have invented a new and useful Controllable Headlight for Automobiles, of which the following is a specification.

The invention relates to an automatic controlling device for automobile headlights.

The object of the present invention is to improve the construction of devices for automatically turning the headlights of an automobile as the direction of the latter is turned, and to provide a simple, inexpensive and practical device of this character of light and compact construction, adapted to be readily applied to an automobile for turning the headlights thereof in the same direction and at the same angle as the front wheels of an automobile, and equipped with means for enabling the headlight turning mechanism to be thrown out of operation and the headlights rigidly secured straight to the front when desired.

A further object of the invention is to provide a headlight controlling device, equipped with means adapted to control the amount of motion transmitted to the headlights, and capable of permitting a limited lost motion for preventing the lateral movement incident to the slight turning or weaving of the wheels from being transmitted to the headlights and producing a swaying of the same from side to side.

The invention also has for its object to provide means for holding the headlights straight to the front until there is sufficient lateral movement of the front wheels to cause a positive turn or change in the direction of movement of the automobile.

With these and other objects in view, the invention consists in the construction and novel combination of parts hereinafter fully described, illustrated in the accompanying drawings, and pointed out in the claims hereto appended; it being understod that various changes in the form, proportion, size and minor details of construction, within the scope of the claims, may be resorted to without departing from the spirit or sacrificing any of the advantages of the invention.

In the drawings:—Figure 1 is a perspective view of an automatic headlight controlling device, constructed in accordance with this invention and shown applied to an automobile. Fig. 2 is an enlarged central longitudinal sectional view of the actuating mechanism. Fig. 3 is a transverse sectional view on the line 3—3 of Fig. 2. Fig. 4 is a plan view of the actuating mechanism. Fig. 5 is an enlarged detail view, illustrating the construction for supporting and pivoting the headlights. Fig. 6 is a detail horizontal sectional view on the line 6—6 of Fig. 5. Fig. 7 is a similar view on the line 7—7 of Fig. 2. Fig. 8 is a perspective view, illustrating another form of supporting bracket.

Like numerals of reference designate corresponding parts in all the figures of the drawings.

In the accompanying drawings in which is illustrated the preferred embodiment of the invention, 1 designates an approximately cylindrical casing divided horizontally into upper and lower sections and provided at their meeting edges with lateral extending attaching flanges 2, which are secured together by bolts 3, or other suitable fastening devices. The casing, which may be constructed of any suitable material, is arranged at the rear face of the front axle $3^a$ of an automobile or other motor vehicle, and its front portion 4 is designed to be enlarged to fit the rear groove or channel of the axle $3^a$, when the latter is of such formation, but the casing may be of any desired form, as will be readily understood, and it is provided at the top with spaced forwardly projecting arms 5, curved to fit the top of the front axle $3^a$ and provided with substantially hook-shaped terminals 6, which engage under the top portion of the axle $3^a$ at the front thereof, as clearly illustrated in Fig. 2 of the drawings. The enlarged portion 4 of the casing has a horizontal top face and supports wedges 7, engaging under the top portion of the axle $3^a$ at the back thereof and operated by adjusting screws 8. engaging threaded perforations of the arms 5 and equipped with lock nuts 9. The arms and the adjustable wedges form clamps and rigidly secure the casing 1 at the rear side of the front axle. By locating the casing at the back of the front axle, it is arranged out of the way of the parts carried by the automobile body, and there is no liability of such parts coming in contact with the casing in the vertical movement of the body incident to the cushioning action of the supporting springs.

The lower section of the casing 1 is provided with a central vertical pivot post 10, extending upwardly from the bottom of the casing and terminating short of the top thereof, and forming a journal or pivot for a horizontal beveled gear 11, provided with a vertical tubular stem 12, which extends upwardly through a central opening 13 in the top of the casing. The horizontal beveled gear meshes with vertical beveled pinions 14, located at opposite sides of the casing and connected by flexible shafts 15 with headlights or lamps 16. The horizontal beveled gear has a central opening, and the lower portion of the bore or opening of the tubular stem is smooth to fit the pivot post while the upper portion is provided with interior screw threads 17 engaged by a cap screw 18 having an enlarged head projecting horizontally beyond the upper end of the tubular stem for confining an inner or front enlarged end 19 of an oscillatory arm 20 on the upper portion of the tubular stem. The cap screw, which is provided in its upper face with a groove to receive the blade of a screw driver, is adapted to be rotated to raise and lower the horizontal beveled gear to carry the same into and out of mesh with the beveled pinions 14, which facilitate accurately assembling of the parts and proper alinement of the headlights, as the horizontal beveled gear is adapted to remain out of mesh with the beveled pinions until the headlights and the other parts of the device are assembled and arranged in proper position after which the horizontal beveled gear is raised into mesh with the pinions 14.

The horizontal oscillatory arm 20, which extends rearwardly from the top of the casing, is provided in its enlarged inner or front end with a circular opening 21 to fit the upper portion of the tubular stem 12, and it is provided at the bottom of the opening with an annular recess or counterbore 22 into which extends a vertical annular flange 23 of the casing. The flange 23, which surrounds the opening 13, forms a relatively fixed bearing for the oscillatory arm 20. The arm 20 is provided in its rear portion with a longitudinal slot 24 in which operates a vertical pin 25, secured at the lower end by a sectional clamp or collar 26 to a transverse connecting rod 27. The transverse rod 27, which is of the usual construction, is connected with the arms 28 of spindles 29 of the front axle, and adapted to be shifted in the ordinary manner to turn the spindles in their pivots 30 for changing the direction of the automobile. The movement of the connecting rod 27 laterally of the machine oscillates the arm 20 and actuates the horizontal beveled gear, motion being communicated therefrom through the beveled pinions and the flexible shafts to the headlights for turning the same in the same direction as the wheels. The collar or clamp 26 is composed of upper and lower sections having outwardly bent terminals secured together by bolts 31, but any other suitable means may be employed for mounting the vertical pin 25 on the laterally shiftable connecting rod of the steering mechanism.

Beveled gearing is employed for rotating the flexible shafts, and the beveled pinions are of less diameter than the beveled gear, but any other suitable gearing may, of course, be employed for this purpose.

In order to cause the headlights to turn to the same extent or angle as the wheels, the oscillatory arm and the tubular stem of the beveled gear are equipped with a lost motion device comprising an adjustable screw 32, mounted in a horizontal opening 33 in the oscillatory arm at a point in rear of the tubular stem and coacting with a polygonal portion thereof having flat central and side faces 34 and 35. The oscillatory arm is provided adjacent to its front or pivoted end with an upward bend 36 to clear the screw 32, and the opening 33 is threaded to engage the screw. The faces 34 and 35 of the polygonal portion are vertical, and the side faces 35 are arranged at an angle to the central face 34. The inner end 37 of the screw 32 is tapered or rounded, and is adapted to be arranged in different positions with relation to the central and side faces of the polygonal portion of the stem of the horizontal beveled gear to permit a limited movement of the oscillatory arm independently of the horizontal beveled gear and also to enable the device to be thrown out of operation when it is desired to maintain the headlights rigidly in their normal position. When the screw 32 is moved outwardly and its tapered end is carried outwardly beyond the path of the faces of the polygonal portion of the vertical stem of the horizontal gear 11, the arm 20 is adapted to oscillate without imparting rotary movement to the said gear, and the headlights will remain in their stationary position with relation to the supporting means. The screw is also adapted to be adjusted to permit just sufficient independent movement of the oscillatory arm to compensate for the differences in the diameter of the gears, so that the headlights will be turned to the same angle as the front wheels. This lost motion also permits the slight turning or weaving of the wheels, while the machine is traveling in practically a straight line, without transmitting such weaving motion to the headlights and causing a swaying or vibration of the same. The amount of lost motion may be varied by adjusting the screw inwardly and outwardly.

The beveled pinions 14 are provided with horizontal stems 38, extending outwardly through openings in the sides of the casing, which are provided with laterally projecting tubular extensions 39, forming extended bearings and providing abutments for fixed collars or flanges 40 of the stems 38. The flexible shafts 15, which are suitably secured to the stems 38, are arranged within flexible tubes 41, which are connected with the tubular portions 39 of the casing 1 by cuffs 42 fitted on and suitably secured to the tubular extensions 39 of the casing and having reduced portions, which are connected with the adjacent ends of the flexible tubes 41.

The other ends of the flexible shafts are suitably secured to the lower ends of the vertical pivots 43 of lamp brackets 44 mounted in bearing openings 45 of supporting brackets 46. The supporting brackets 46 consist of a vertical stem or body portion provided at its upper end with a horizontal arm or portion having the stem or body portion is provided with an attaching shank 47, threaded at its lower end to receive a nut 48 and provided at the top with a collar or flange 49, forming a shoulder to fit against the part 50 on which the bracket 46 is mounted. The bracket may be mounted on any fixed portion of the automobile, and the upper portion of the attaching shank is preferably squared to fit a squared opening in the said part 50, whereby the bracket is maintained in a fixed position with relation to the body of the automobile. The supporting bracket is also provided at the bearing opening 45 with a depending exteriorly threaded annular flange 51 to which is connected an interiorly threaded cuff 52, constituting an enlarged metallic extension of the adjacent end of the flexible tube 41 and having a reduced portion suitably secured to the same. The pivot 43, which extends downwardly through the bearing opening 45 from the base 53 of the lamp bracket, is held against vertical movement therein by means of a nut 54, engaging a threaded portion of the pivot 43 and fitting against the lower edge of the depending annular flange 51.

The supporting bracket is provided at the top of the opening 45 with an upwardly extending annular flange 55, provided at the front with a recess 56 and at the back with a notch or indentation 57. The lamp bracket base 53, which rests upon the upper face of the bearing portion of the supporting bracket, is provided with an annular groove or recess 58, which receives the upwardly extending flange 55. The front recess 55, which is substantially rectangular in horizontal section, has parallel vertical walls, and is adapted to be engaged by a reduced terminal portion 59 of a screw 60 mounted in a threaded horizontal opening 61 in the front portion of the base of the lamp bracket and adapted when screwed into engagement with the recess 55 of the flange of the bearing bracket to maintain the lamp bracket rigid therewith. When the screw 60 is withdrawn from engagement with the recess 55 of the supporting bracket, the latter is free to rotate in the bearing opening 45 of the supporting bracket.

The rear recess or indentation 57 is tapered to present inclined or beveled faces to a tapered engaging end of a spring actuated pawl 62, consisting of a horizontal pin mounted in a bore or opening 63 of the base of the lamp bracket and engaged by a coiled spring 64. The coiled spring 64 is interposed between the outer end of the pawl and a screw plug 65 engaging interior threads in the outer portion of the bore or opening 63. The tapered pawl yieldably engages the upwardly extending flange of the supporting bracket and is adapted to hold the bracket and the headlights steady during the slight turning or weaving of the wheels while the machine is traveling in a practically straight well defined course, and while the tapered adjusting screw is out of positive engagement with the polygonal portion of the vertical stem of the horizontal beveled gear. When, however, the machine is turned, the adjusting screw positively engages one of the vertical faces of the stem of the horizontal beveled gear and positively actuates the same and correspondingly rotates the lamp brackets carrying the beveled end of the pawls and the beveled or inclined faces of the notches or indentations 56 permitting such turning movement of the lamp brackets. As soon as the lamp brackets are returned to their normal straight ahead position, the spring actuated pawls automatically engage the notches or indentations 56 and maintain the lamp brackets in such position until they are again positively actuated by the steering mechanism of the machine.

The lamp bracket is equipped with spaced upwardly extending arms 66 for supporting the lamps or headlights 16 in the usual manner. The supporting bracket 46 is adapted to be substituted for the ordinary lamp bracket, but the device may be applied to a machine equipped with ordinary lamp brackets by means of a supporting bracket 67. The supporting bracket 67, which has a bearing portion 68 at the bottom thereof, consists of a pair of upwardly diverging arms connected at their lower ends to the bearing portion 68 and provided at their upper ends with sleeves 69 to fit over the supporting arms of the ordinary lamp bracket. The supporting bracket 67 is equipped at its upper end with clamping screws 70, mounted in threaded perforations of the sleeves 69 and adapted to secure the same rigidly to the arms of an ordinary lamp bracket.

What is claimed is:—

1. An automatic headlight controlling device including spaced pivotally mounted headlights, centrally arranged gearing, means for transmitting motion from the gearing to the headlights, and means for connecting the gearing with the steering mechanism of an automobile, the last-mentioned means having a single lost motion device located at the said central gearing to permit a limited independent movement of the steering mechanism to prevent the slight turning or weaving of the wheels of the machine from being transmitted to either of the headlights.

2. An automatic headlight controlling device including spaced pivotally mounted headlights, centrally located gearing, and oscillatory arm, means for connecting the latter with the steering mechanism of an automobile, means for connecting the arm with the gearing, the latter means having a single lost motion device located at the said central gearing to permit independent movement of the arm and adapted to prevent the slight turning or weaving of the wheel from being communicated to either of the headlights and also capable of permitting the arm to be disconnected from the gearing.

3. An automatic headlight controlling device comprising spaced pivotally mounted headlights, centrally located gearing including a gear having a stem, means for transmitting motion from the gearing to the headlights, an oscillatory arm having an opening receiving the stem, means carried by the arm and coacting with the stem to permit the arm to have movement independently of the said gearing, and means for connecting the oscillatory arm with the steering mechanism of an automobile.

4. An automatic headlight controlling device comprising pivotally mounted headlights, gearing including an actuating gear having a stem provided with a polygonal portion, means for connecting the gearing with the head lights, an oscillatory arm having an opening receiving the said stem, means for connecting the oscillatory arm with the steering mechanism of an automobile, and adjustable means carried by the oscillatory arm and arranged to coact with the polygonal portion of the stem to permit the arm to have movement independently of the stem.

5. An automatic headlight controlling device comprising pivotally mounted headlights, gearing including a gear having a stem provided with a polygonal portion, an oscillatory arm having an opening receiving the stem, and a screw mounted on the arm and arranged to coact with the polygonal portion to actuate the said gear and to permit the arm to have limited movement independently of the gearing, and means for connecting the arm with the steering mechanism of an automobile.

6. An automatic headlight controlling device comprising pivotally mounted headlight, gearing including a gear having a stem provided with a polygonal portion consisting of a central and side faces, an oscillatory arm provided with an opening receiving the stem, and a screw mounted on the oscillatory arm and having a tapered or rounded portion arranged to coact with the polygonal portion of the stem for actuating the gear and to permit independent movement of the arm, and means for connecting the oscillatory arm with the steering mechanism of an automobile.

7. An automatic headlight controlling device including pivotally mounted headlights, a casing, opposite vertical gears arranged within the casing, a horizontal gear also located within the casing and having a stem and movable vertically to carry it into and out of mesh with the said gears, an oscillatory arm provided with means for operatively connecting it with the stem, means for transmitting motion from the side gears to the headlights, and means for connecting the arm with the steering mechanism of an automobile.

8. An automatic headlight controlling device including pivotally mounted headlights, a casing, spaced vertical gears arranged within the casing, means for transmitting motion from the vertical gears to the headlights, a horizontal gear having a threaded stem extending through the casing, an oscillatory arm mounted on the casing and provided with means for actuating the stem, and a screw engaging the threaded portion of the stem and adapted to raise and lower the same to carry the horizontal gear into and out of mesh with the vertical gears, and means for connecting the oscillatory arm with the steering mechanism of an automobile.

9. An automatic headlight controlling device including pivotally mounted headlights, a casing, spaced vertical gears located within the casing, means for transmitting motion from the vertical gears to the headlights, a horizontal gear having an interiorly threaded stem extending through the top of the casing, an oscillatory arm mounted on the casing and having an opening receiving the stem, a screw engaging the threads of the stem for raising and lowering the horizontal gear to carry the same into and out of mesh with the vertical gear, said screw having a head retaining the oscillatory arm on the casing, means carried by the arm for connecting it with the stem, and means for connecting the arm with the steering mechanism of an automobile.

10. An automatic headlight controlling device including pivotally mounted headlights, a casing provided at its bottom with a vertical pivot post, vertical gears mounted within the casing at opposite sides thereof, means for transmitting motion from the vertical gears to the headlights, a horizontal gear having a tubular stem mounted on the pivot post and extending through the top of the casing, an arm mounted on the casing and provided with means for connecting it with the stem, means for raising and lowering the horizontal gear to carry the same into and out of mesh with the vertical gears, and means for connecting the oscillatory arm with the steering mechanism of an automobile.

11. An automatic headlight controlling device including pivotally mounted headlights, a casing designed to be located in rear of the front axle of an automobile and provided with a substantially hook-shaped arm adapted to engage over the front axle, a wedge mounted on the casing and coacting with the arm to clamp the axle, means for adjusting the wedge, gearing housed within the casing, means for connecting the gearing with the steering mechanism of an automobile, and means for transmitting motion from the gearing to the headlights.

12. An automatic headlight controlling device including pivotally mounted headlights, gearing, an oscillatory arm, means for connecting the oscillatory arm with the steering mechanism of an automobile, means for connecting the arm with the gearing, the latter means having a lost motion device adapted to permit independent movement of the arm and capable also of throwing the gearing out of operation, means for transmitting motion from the gearing to the headlights, and means for locking the headlights in a fixed position when the gearing is thrown out of operation.

13. An automatic headlight controlling device including a supporting bracket having a bearing opening and provided thereat with a projecting flange having an indentation, a lamp bracket seated upon the supporting bracket and having a pivot extending through the bearing opening, said lamp bracket being also provided with a groove or recess for the projecting flange of the supporting bracket, a spring actuated dog mounted on the lamp bracket at the groove thereof and arranged to engage the notch or indentation and adapted to release the lamp bracket automatically, and means actuated by the steering mechanism of an automobile and connected with the pivot of the lamp bracket for turning the latter.

14. An automatic headlight controlling device including a bearing bracket having a bearing opening and provided with a depending flange, a lamp bracket having a pivot mounted in the said bearing opening, a casing provided with a tubular portion, a gear having a stem extending through the tubular portion, a flexible shaft connected with the stem and with the said pivot, a flexible tube receiving the said shaft and provided at its ends with cuffs secured, respectively, on the flange of the supporting bracket and the tubular portion of the casing, and means connected with the steering mechanism of an automobile for actuating the said gear.

15. An automatic headlight controlling device including a supporting bracket having a bearing opening and provided with a depending annular flange, a lamp bracket having a pivot mounted in the opening of the supporting bracket, a nut carried by the pivot and located beneath the flange, a flexible shaft secured to the pivot, a flexible tube having a cuff incasing the nut and secured to the said flange, and means actuated by the steering mechanism of an automobile and connected with the flexible shaft for turning the same.

In testimony, that I claim the foregoing as my own, I have hereto affixed my signature in the presence of two witnesses.

FRANCIS G. ANSPACH.

Witnesses:
ALBERT A. CHESMAN,
JAMES MANNING.